United States Patent
Horii

(10) Patent No.: US 8,498,530 B2
(45) Date of Patent: Jul. 30, 2013

(54) DETECTION APPARATUS AND METHOD

(75) Inventor: Hiroyuki Horii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1001 days.

(21) Appl. No.: 12/553,024

(22) Filed: Sep. 2, 2009

(65) Prior Publication Data

US 2010/0052545 A1   Mar. 4, 2010

(30) Foreign Application Priority Data

Sep. 4, 2008   (JP) .................... 2008-226987

(51) Int. Cl.
*G03B 15/03* (2006.01)
(52) U.S. Cl.
USPC ......................................... 396/155; 396/166
(58) Field of Classification Search
USPC .................... 353/85; 396/155, 156
See application file for complete search history.

(56) References Cited

U.S. PATENT DOCUMENTS

| 6,079,892 A | 6/2000 | Yamaguchi | |
| 7,465,052 B2 * | 12/2008 | Belliveau | 353/30 |
| 7,499,641 B2 * | 3/2009 | Uchiyama | 396/246 |
| 7,559,670 B2 * | 7/2009 | Belliveau | 362/233 |
| 2007/0263999 A1 * | 11/2007 | Keam | 396/155 |

FOREIGN PATENT DOCUMENTS

| JP | 60-210718 A | 10/1985 |
| JP | 08-145722 | 6/1996 |
| JP | 09-318322 A | 12/1997 |
| JP | 2003-189162 A | 7/2003 |

* cited by examiner

*Primary Examiner* — Thuy Vinh Tran
(74) *Attorney, Agent, or Firm* — Canon U.S.A., Inc. IP Division

(57) ABSTRACT

A detection apparatus determines whether an output of the light-receiving unit meets a predetermined reference level when the light emission amount of the light-emitting unit is changed, under a condition that the output of the light-receiving unit changes according to a change in a light emission amount of the light-emitting unit. The detection apparatus detects, based on the output from the light-receiving unit, that the light emitted from the light-emitting unit to the light-receiving unit is blocked, under a condition that the light-emitting unit is emitting light based on a light emission amount emitted from the light-emitting unit when it has been determined that the output of the light-receiving unit meets the predetermined reference level.

21 Claims, 9 Drawing Sheets

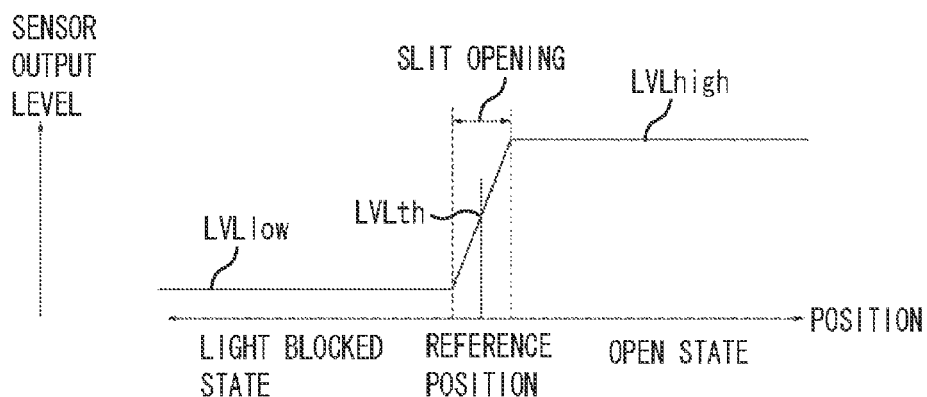

DETECTION APPARATUS AND METHOD

BACKGROUND OF THE INVENTION

1. Field of the Invention

The present invention relates to a detection apparatus and a method for detecting whether light is interrupted.

2. Description of the Related Art

Conventionally, the reference position in a machine that drives mechanism therein is detected by mechanical switches or photo-sensors.

However, the mechanical switches include tolerance and backlash and therefore they are not suitable for detecting the reference position with high accuracy. In detecting the reference position using a photo-sensor, generally, a current (light emission amount) on the light emitting side is fixed at a predetermined level, and an output from the light-receiving side is detected by comparing with a threshold value as the reference position.

In this case, a light emission amount may be set to be large on the light-emitting side and a load resistance value may be set to be large on the light-receiving side, so that the output of the light-receiving side reaches a saturation level even though a very small current induced by the incident light flows on the light-receiving side.

With regard to the encoder, Japanese Patent Application Laid-Open No. 08-145722 discusses a technique that a current from the LED is controlled so that added up current of output currents from a plurality of sensors should be at constant level to prevent drop in detection sensitivity due to dark current. Regarding a threshold value for making a decision in detecting a position, U.S. Pat. No. 6,079,892 discusses a detection apparatus for detecting an edge of paper by reflected light.

In the conventional methods, however, the detected position will vary owing to factors, such as a light emission amount of the light-emitting-side LED in a photo-sensor, photoelectric conversion characteristics of a light-receiving sensor, signal-to noise characteristics of an output signal, and threshold value characteristics for digitizing an output signal.

More specifically, the output level of the photo-sensor changes with variation of the photo-sensor, and also due to the effects of environmental change, such as temperature and voltage, and deterioration with time. Therefore, a resulting problem is that the reference position to be detected changes, and thus it is impossible to detect the reference position with high accuracy.

This problem will be concretely described with reference to FIG. 7. FIG. 7 illustrates relationship between mechanical positions and output levels when the photo interrupter is used as a photo-sensor.

In FIG. 7, the horizontal axis indicates the position of a reference position detection flag (light blocking plate). The vertical axis indicates the output level of the light-receiving sensor. The dotted line represents the width of the slit opening of the photo interrupter with respect to the positions of the reference position detection flag on the horizontal axis.

In FIG. 7, depending on the position of the reference position detection flag, the operation of the photo interrupter is illustrated in three states: a light-blocked state in which the light of the photo interrupter is completely blocked, a partially light-blocked state, and an open state in which all of the light reaches the light-receiving unit.

In the completely light-blocked state in which the reference position detection flag completely covers the slit opening of the photo interrupter, because the emitted light does not reach the light-receiving unit, the output level is at a level close to "0" (only a dark current flows). On the other hand, in the open state in which the reference position detection flag is positioned outside of the slit opening of the photo interrupter, the output level of the light-receiving sensor is at a high, almost saturated level.

Conventionally, the reference position is set to be at a position where an intermediate value between the output levels of the light-receiving sensor respectively obtained in the light-blocked state and in the open state. However, in this case, the reference position changes by the factors described above. In other words, by variations of the sensors, changes in the light amount emitted from the LED, and temperature changes, for example, the output level of the light-receiving sensor changes as indicated by the solid line, the dotted line, and the long and short dash line in FIG. 7, and therefore a detected reference position may vary.

SUMMARY OF THE INVENTION

The present invention is directed to an apparatus for detecting a reference position at which light is blocked, with high accuracy.

According to an aspect of the present invention, a detection apparatus includes a control unit configured to control a light emission amount emitted from a light-emitting unit, a light-receiving unit configured to receive light from the light-emitting unit, and a determination unit configured to determine whether the output of the light-receiving unit meets a predetermined reference level when the light emission amount of the light-emitting unit is changed, in a condition that the output of the light-receiving unit changes according to a change of the light emission amount of the light-emitting unit under the control by the control unit, wherein the determination unit detects based on the output of the light-receiving unit that the light emitted from the light-emitting unit to the light-receiving unit is blocked, in a condition that the light-emitting unit is emitting light in accordance with the light emission amount emitted from the light-emitting unit when the determination unit determines that the output of the light-receiving unit meets the predetermined reference level.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A and 10B illustrate a mechanical operation of the reference position detection processing.

DETAILED DESCRIPTION OF THE EMBODIMENTS

Various exemplary embodiments, features, and aspects of the invention will be described in detail below with reference to the drawings.

An exemplary embodiment of the invention will be described referring to a network camera, for example, to which the detection apparatus of the invention is applied.

Figure 1:
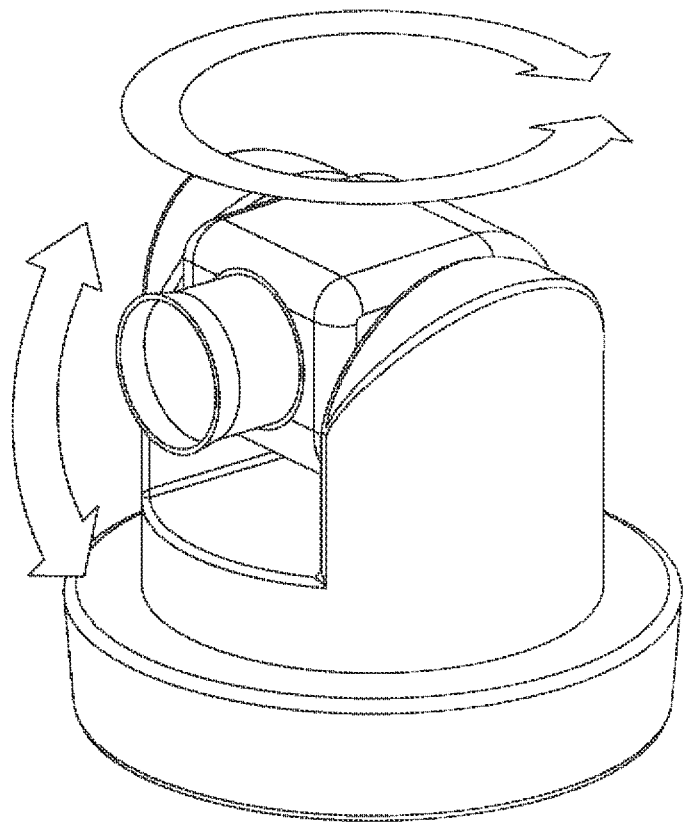
FIG. 1 is an external view of a network camera.

FIG. 1 is an external view of a network camera capable of panning and tilting. A panning device for horizontally rotating the image capturing unit and a tilting device for vertically rotating the image capturing unit are mounted on the base. This exemplary embodiment concerns a mechanically driven pan/tilt mechanism. As an example, a process for accurately detecting a reference position, which is used when operating the above mechanism, is described below.

Figure 2:
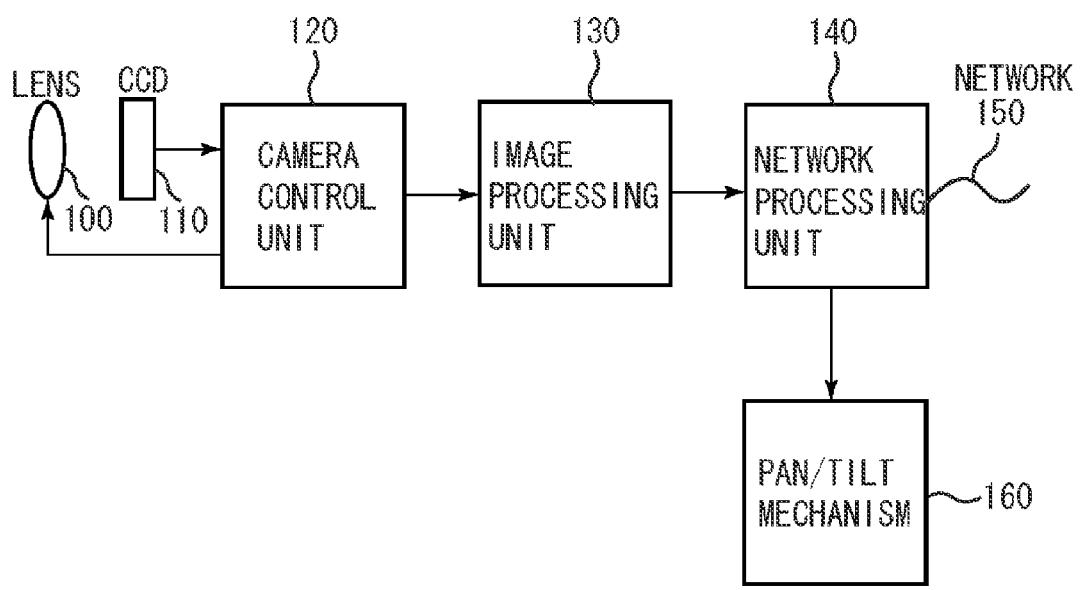
FIG. 2 is a block diagram of the network camera.

FIG. 2 is a block diagram of a pan/tilt network camera according to this exemplary embodiment. The network camera in FIG. 2 includes a lens 100, an image sensor 110 such as a CCD, a camera control unit 120, an image processing unit 130, a network processing unit 140, a pan/tilt mechanism 160 as a detection unit.

Light transmitting through the lens 100 is converted into an electric signal by photoelectric conversion by the image sensor 110 under control of the camera control unit 120. The electric signal is subjected to signal processing, image processing, and compression processing by the image processing unit 130 under control of the camera control unit 120. The processed image data is transmitted to another apparatus connected to the network 150 via the network processing unit 140.

In response to a command received from the other apparatus at the other end on the network via the network 150 or according to a predetermined sequence, the network processing unit 140 drives a pan motor or a tilt motor of the pan/tilt mechanism 160 to change the shooting direction of the network camera.

Figure 3:
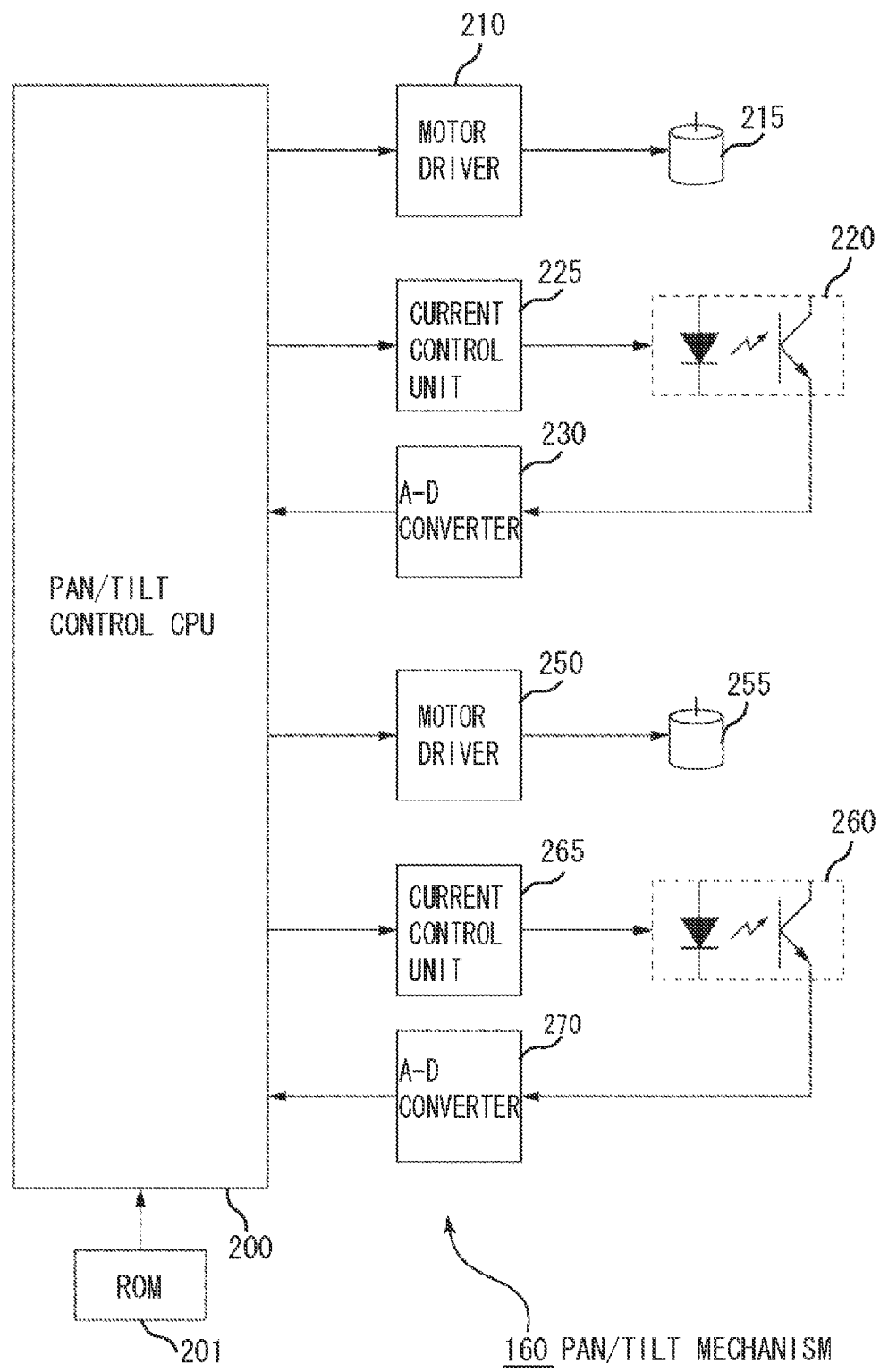
FIG. 3 is a block diagram of a pan/tilt control unit.

FIG. 3 is a detailed block diagram of the pan/tilt mechanism 160 in FIG. 2. In FIG. 3, the pan/tilt control CPU 200 controls the whole operation of the pan/tilt mechanism 160 according to a computer-executable program.

The pan/tilt control CPU 200 performs comprehensive control of the pan/tilt mechanism 160 by reading a computer-executable program from ROM 201 (computer-readable medium).

The pan/tilt mechanism 160 includes a pan motor driver 210, a pan motor 215, and a reference position detection sensor (photo interrupter) 220 for panning. The pan/tilt mechanism 160 includes a current control unit 225 to control a light emission amount of the LED of the sensor 220, and an analog to digital (A/D) converter 230 for A/D conversion of an output signal from the phototransistor of the sensor 220.

The pan/tilt mechanism 160 includes a motor driver 250 for tilting, a tilt motor 255, and a reference position detection sensor (photo interrupter) 260 for tilting. Furthermore, the pan/tilt mechanism 160 includes a current control unit 265 for controlling an emission amount of the LED of the sensor 260, and an A/D converter 270 for A/D conversion of an output signal from the phototransistor of the sensor 260.

Figure 4A:
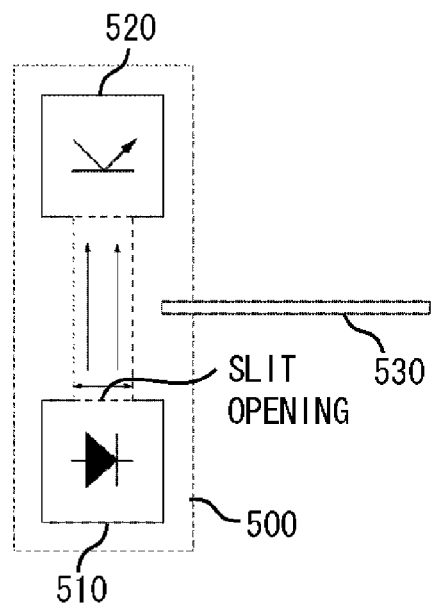
FIGS. 4A to 4C are diagrams illustrating a photo interrupter and a reference position detection flag.
Figure 4B:
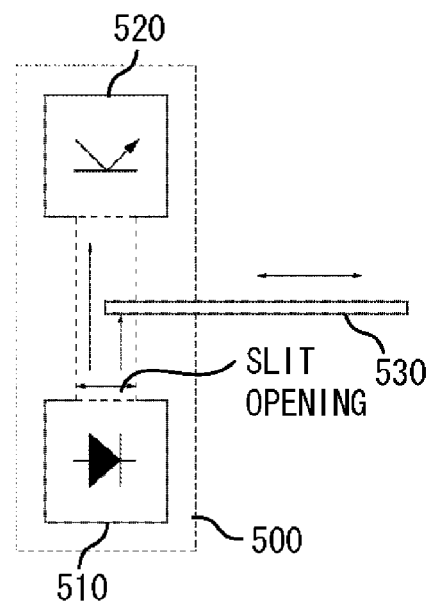
Figure 4C:
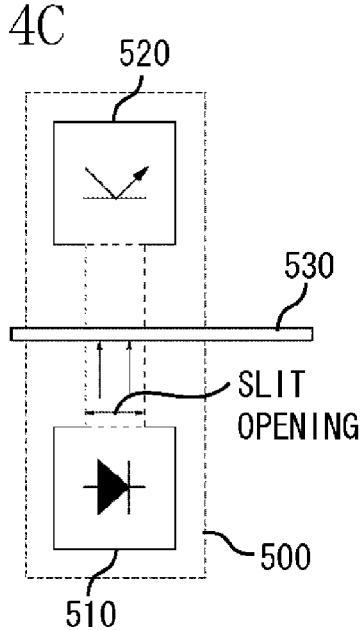

FIGS. 4A to 4C illustrate a positional relationship between a photo interrupter for detecting the reference position and a reference position detection flag. In FIGS. 4A to 4C, the photo interrupter 500 includes the LED 510 as the light-emitting element, and the phototransistor 520 as the light-receiving sensor of the light-receiving portion. The reference position detection flag 530 is formed by a light blocking plate. The light blocking plate is moved by the pan motor 215 (or the tilt motor 255).

In response to a command from the pan/tilt control CPU 200 in FIG. 3, the pan motor driver 210 (or 250) drives the motor 215 (255) for panning (or tilting). As a result, the relative position between the reference position detecting photo interrupter 500 and flag 530 changes.

FIG. 4A illustrates the condition in which the flag 530 is located outside of the slit opening area of the photo interrupter 500, and therefore the light from the light-emitting-side LED 510 is not blocked (open state). FIG. 4B illustrates the condition in which the flag 530 has come to the middle position of the slit opening area of the photo interrupter 500, thus blocking part of the light emitted from the light-emitting-side LED 510. FIG. 4C illustrates the condition in which the flag 530 completely covers the slit opening area of the photo interrupter 500 to thereby intercept the light emitted from the LED 510.

Figure 5:
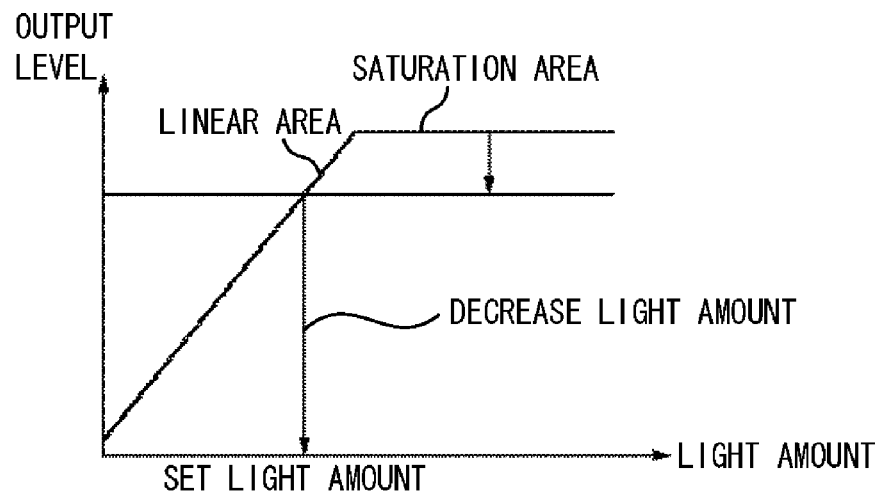
FIG. 5 is a graph illustrating relationship between light amount and an output level.

FIG. 5 is a graph illustrating relationship between the light emission amount of the light-emitting-side LED 510 and the output level of the phototransistor 520 when the flag 530 is positioned outside of the photo interrupter 500 (in open state).

For convenience of explanation, this exemplary embodiment will be described assuming that the output level is higher when more incident light is received by the light-receiving unit and the output level is lower when less incident light is received. However, this depends on the circuit structure. However, it may be opposite to that. That is, the output level is lower when more incident light is received by the light-receiving unit and the output level is higher when the less incident light is received.

As illustrated in FIG. 5, normally, as the light emission amount of the light-emitting-side LED 510 is increased, the output level of the phototransistor 520 generally increases linearly.

When the light emission amount equal to or higher than a predetermined level, the output level of the phototransistor 520 is saturated and stays at a constant level. In this exemplary embodiment, the pan/tilt control CPU 200 determines an area where the output level changes almost linearly with respect to the light emission amount, and determines a reference position within the area.

As described above, the output level is saturated with more light amount than a predetermined level. Therefore, as illustrated in FIG. 5, the pan/tilt control CPU 200 determines that the output level of the phototransistor 520 has decreased below the saturation area and goes into the linear area as the light amount of the light-emitting-side LED 510 is decreased from the maximum light amount.

The light amount at this time is specified as a set light amount of the light-emitting-side LED 510. Since the light amount of the light-emitting-side LED 510 is set at the determined light amount, the output level of the photo transistor 520 changes almost linearly with respect to the received light amount.

In other words, when the flag 530 enters the slit opening area and the flag 530 intercepts part of the light from the light-emitting-side LED 510, the received light amount of the phototransistor 520 is limited according to the position of the flag 530. At the same time, the output level of the phototransistor 520 can be obtained according to the limited received light amount.

More specifically, the light emission amount of the light-emitting-side LED 510 can be limited in the following manner, for example. The current flowing in the LED 510 is controlled to change by small amount at a time by using a D/A converter. The current flowing in the LED 510 is controlled by adjusting a current-limiting resistor using a 3-bit or 4-bit port.

Figure 6:
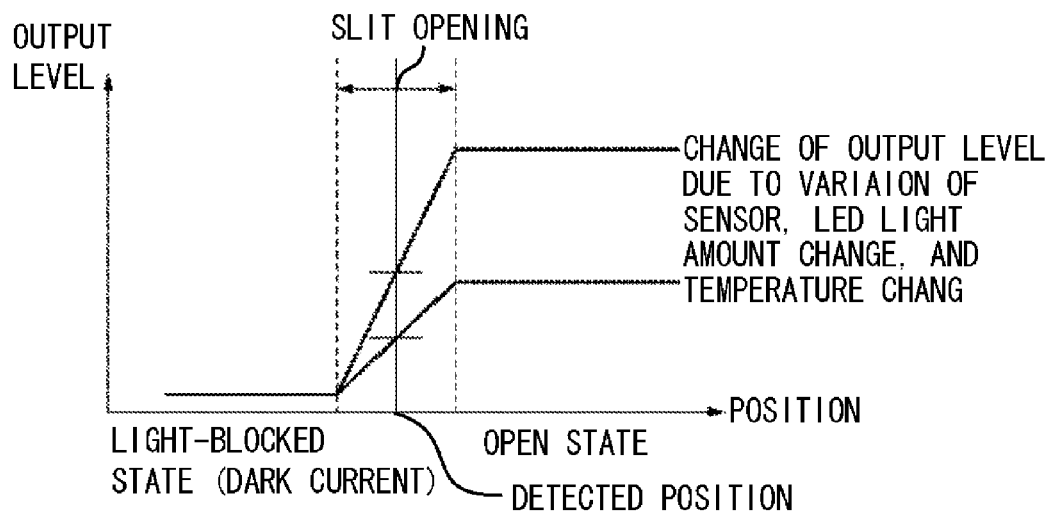
FIG. 6 is a graph illustrating relationship between a reference position detection flag and an output level.

FIG. 6 is a graph illustrating relationship between the position of the flag 53 with respect to the photo interrupter and the output level of the phototransistor 520. In FIG. 6, the horizontal axis indicates the position of the flag 530 and the vertical axis indicates the output level of the phototransistor 520. The slit opening (width) of the photo interrupter is indicated by dotted lines with respect to the horizontal axis, which represents the position of the flag 530.

Figure 7:
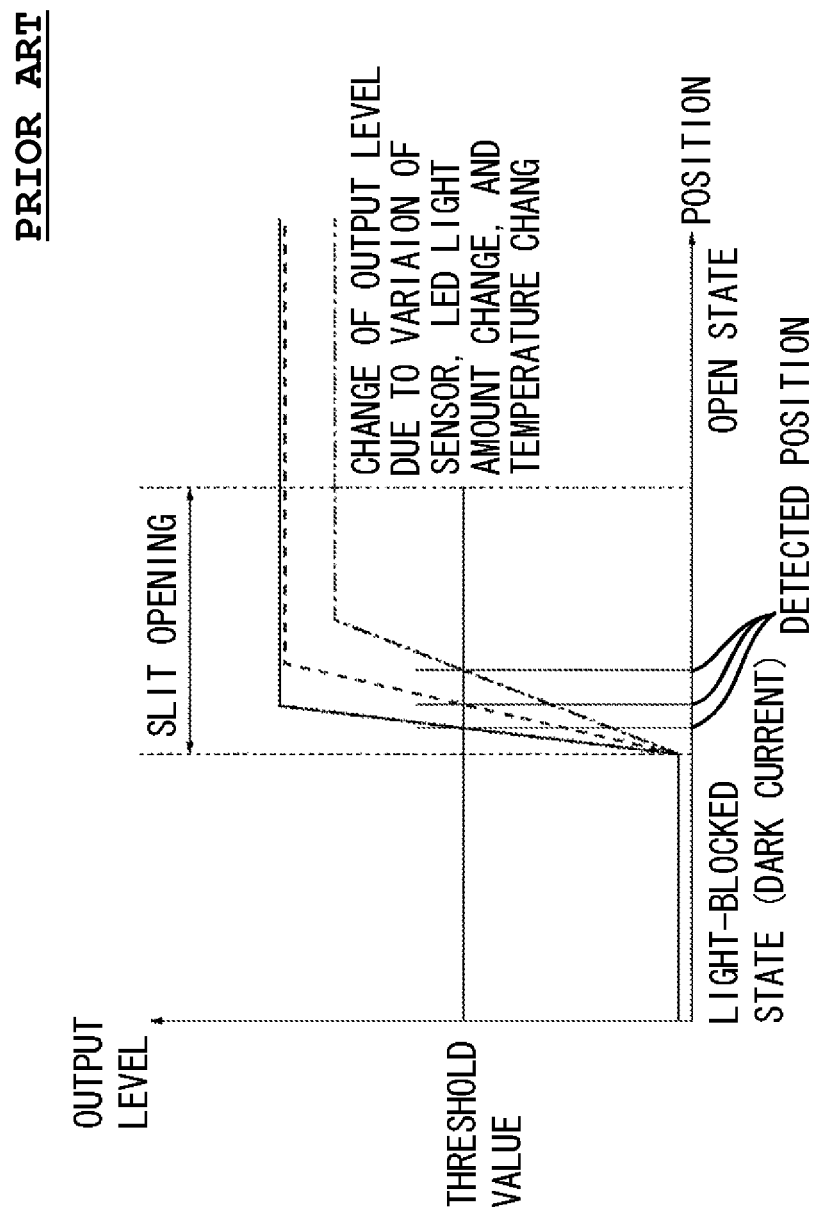
FIG. 7 is a graph illustrating relationship between changes in sensor output and detected positions.

The graph in FIG. 7 indicates that the output level of the phototransistor 520 is saturated while the flag 530 is in the middle of the slit opening because the light emission amount of the LED 510 is too large.

In contrast, in the graph in FIG. 6, the output level is set so as not to be saturated even when the light is emitted to the slit opening in the slit open state as described above. Therefore, the output level of the phototransistor 520 changes almost linearly when the flag 530 extends in the slit opening.

Specifically, as illustrated in FIG. 6, the light emission amount of the light-emitting-side LED 510 is set according to the output level of the phototransistor 520, which changes with variations of the components, the light amount change of the LED, deterioration with time, and environmental changes, such as temperature and voltage. Consequently, the output level of the phototransistor 520 changes almost linearly with respect to the position of the flag when it is positioned with in the slit opening portion.

A certain value of the output level of the phototransistor 520, that is, an intermediate value of the output level between those of the open state and the light-blocked state is used as a threshold value. In this case, when the flag 530 is moved to an intermediate position of the slit opening, the output level of the phototransistor 520 becomes the similar value thereto, so that this intermediate position is designated as the reference position.

Figure 8:
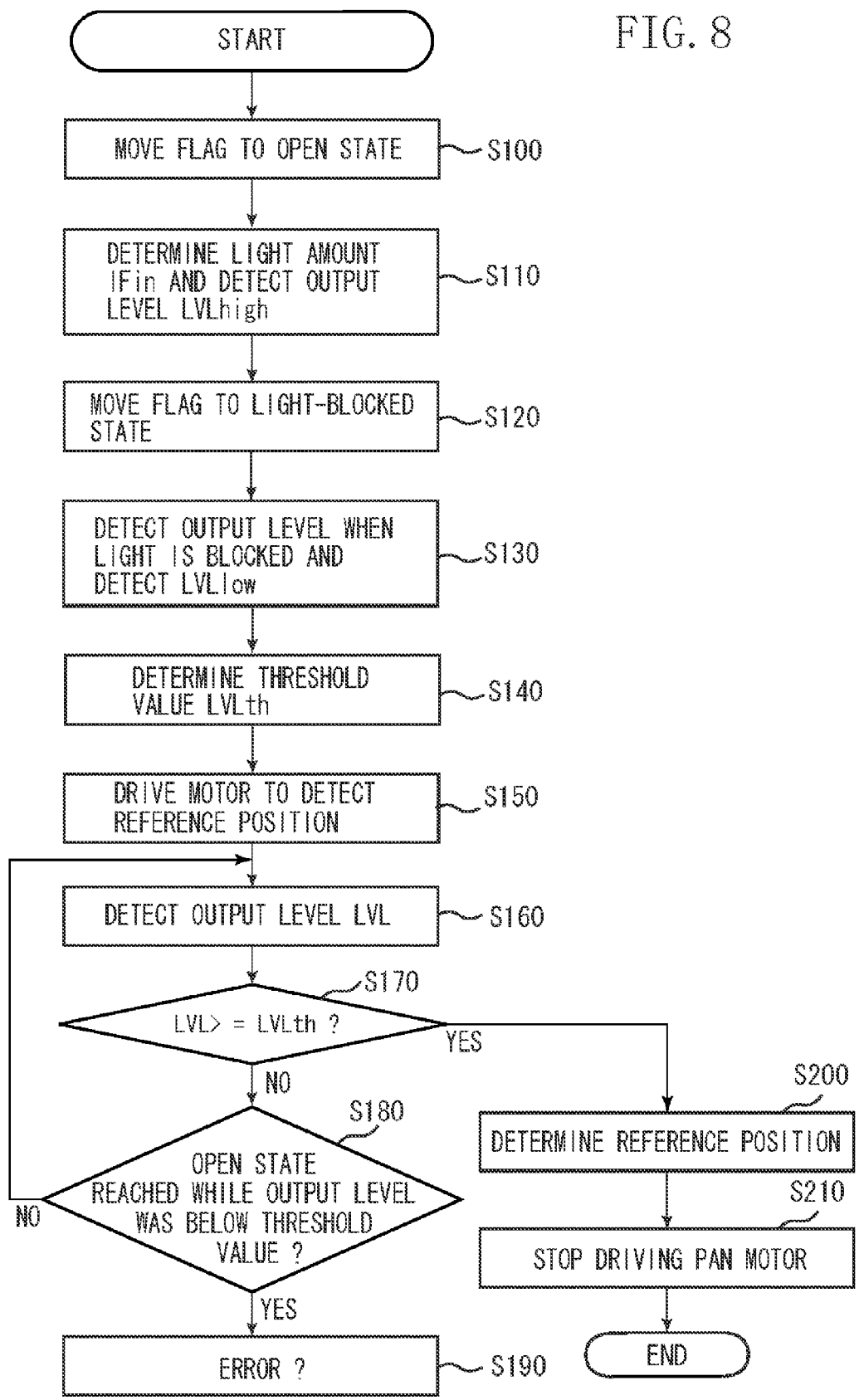
FIG. 8 is a flowchart illustrating an operation of a reference position detection unit.

FIG. 8 is an operation flowchart of the pan/tilt control CPU 200 (hereafter referred to as CPU 200) when a reference position is detected.

Figure 9:
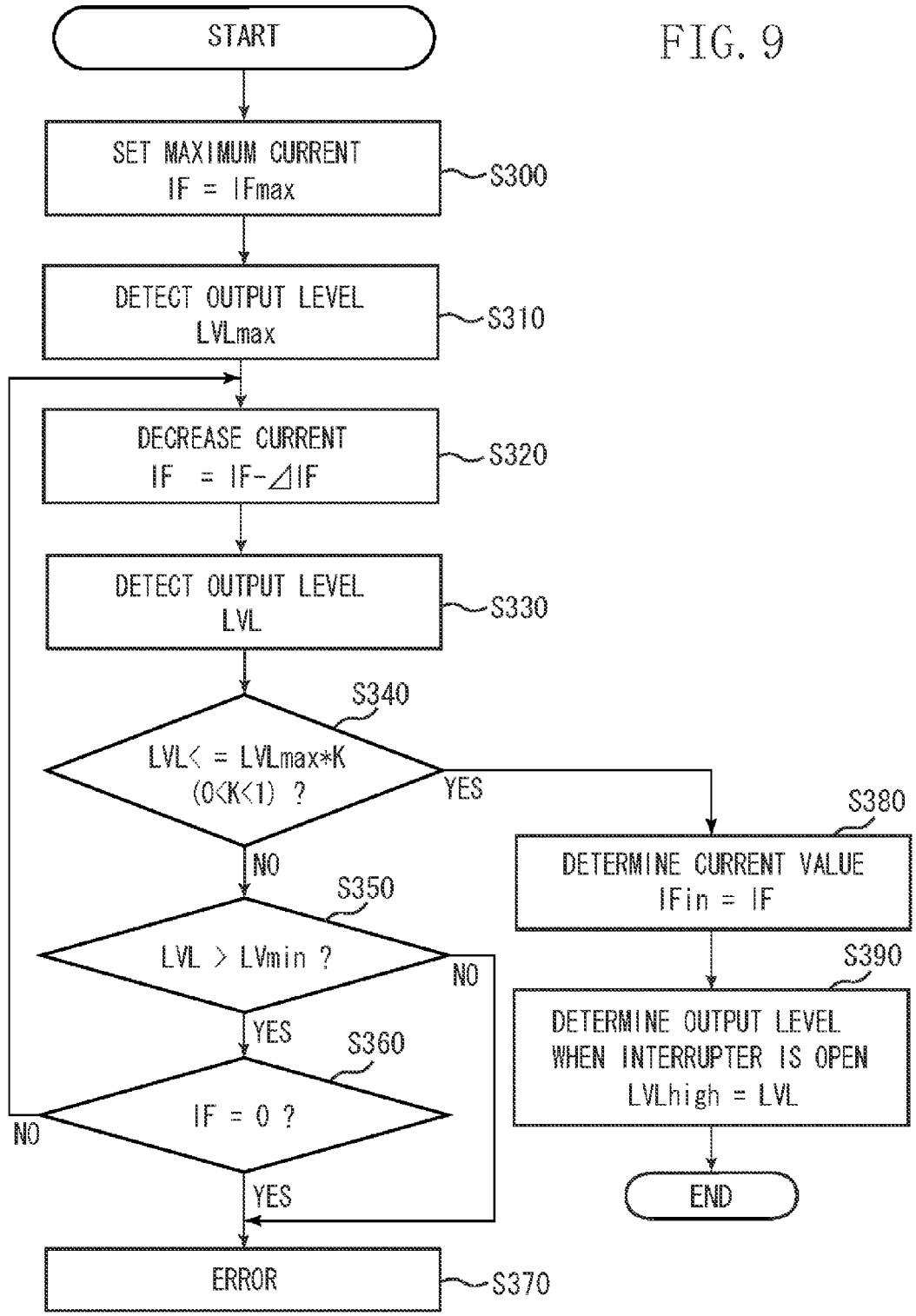
FIG. 9 is a flowchart illustrating an operation of a light emission amount control unit.

FIG. 9 is an operation flowchart of the CPU 200 detecting the output level of the phototransistor 520 with respect to the light emission amount of the LED 510 when the slit is in the open state in which the light from the light-emitting-side LED 510 is not at all blocked by the flag 530.

In FIG. 9, the CPU 200 set the current supplied to the light-emitting-side LED 510 at maximum (IFmax) in step S300. This exemplary embodiment is described referring to the photo interrupter 500 including the LED 510 as the light-emitting unit, for example. Therefore, an electric current is used as a parameter to control a light emission amount. However, for the present invention, the parameter to control the light emission amount is not limited to the electric current.

Then, in step S310, the CPU 200 detects the output level (LVLmax) of the phototransistor 520 when the light emission amount of the light-emitting-side LED 510 is at maximum. The CPU 200 starts searching for the linear area with reference to the output level (LVLmax) when the light emission amount is maximal.

Then, the CPU 200 decreases the current supplied to the light-emitting-side LED 510 (IF=IF×ΔIF). In other words, in S320, the CPU 200 gradually decreases the light emitting amount of the light-emitting-side LED 510 from the maximum light emission amount. The ΔIF is a predetermined value or an arbitrary value (need not be constant). Each time it reduces the light emission amount of the light-emitting-side LED 510, in step S330, the CPU 200 detects an output level of the phototransistor 520.

In step S340, the CPU 200 compares the output level detected in step S330 with the previously detected output level at maximum light emission amount (LVLmax). In step S340, the CPU determines whether the output level detected in step 330 is lower by a predetermined ratio (K) than the output level at the maximum light emission amount. The K is a constant between 0 and 1, that is, a 10 percent (0.1) for example.

As is described above, when the light emission amount is too large, the output level of the phototransistor 520 is saturated. As a criterion to determine whether the relationship between the light emission amount and the output level has become linear from saturated state, it is determined whether the output level is lower by a predetermined ratio from the output level at the maximum light emission amount.

In the present exemplary embodiment, whether the output level lowers by a predetermined ratio using the value obtained by multiplying LVLmax by a constant "K". However, the similar effect can be obtained if it is determined whether the output level lowers by a predetermined amount, not by a ratio.

In step S340, if it is determined that the output level of the phototransistor 520 after the light emission amount is decreased has decreased by a predetermined ration from the output level obtained at the maximum light emission amount (LVLmax) (YES in step S340), the CPU 200 determines that the relationship between the light emission amount and the output level has become linear. And the process advances to step S380.

In step S380, the CPU 200 determines the light emission amount obtained when the relationship between the light emission amount and the output level of the phototransistor 520 has become linear to be a light emission amount to be used when the reference position is detected (the set light amount in FIG. 5). In step S390, the CPU 200 determines that the output level of the phototransistor 520 at the determined light emission amount is the output level (LVLhigh) when the photo interrupter is in the open state.

On the other hand, in step S340, if it is determined that the detected output level has not decreased by a predetermined ratio from the output level at the maximum light emission amount (LVLmax) (NO in step S340), it is determined that the output level is in the saturation area, the process advances to step S350.

In step S350, the CPU 200 determines whether the output level of the phototransistor 520 is lower than a predetermined minimum level (LVLmin). In other words, the CPU 200 determines whether the light emission of the LED 510 has turned off or whether the output level is below the minimum level for position detection.

Normally, the output level does not fall below the minimum level. However, if the output level is not higher than the minimum level (NO in step S350), the process proceeds to step S370, and the CPU 200 determines that an error has occurred. And, the reference position detection process is finished.

If the output level is not lower than the minimum level (YES in step S350), the process advances to step S360. In step S360, the CPU 200, as a result of gradually reducing the current supplied to the light-emitting-end LED 510, determines whether the current falls to "0" or the turned-off state. When the LED 510 is turned off (YES in step S360), the accurate reference position cannot be detected. Therefore, the process advances to step S370. In step S370, the CPU 200 generates an error signal, and the reference position detection process is finished. If the light emission amount does not fall to "0" (NO in step S360), the process returns to step S320, and the CPU 200 again executes a process to reduce the light emission amount, and repeats a series of steps.

As is described referring to FIG. 5, normally, in the photo interrupter 500, as the light emission amount of the light-emitting-side LED 510 is reduced and when the light emission amount becomes lower than a predetermined amount, the output level of the photo interrupter 520 falls below the saturation level. In a repeating processes, when the condition of step S340 is satisfied, the process goes out of a series of steps and proceeds to step S380.

In a description of FIG. 9, a method of detecting a current value when the output level starts to fall, by gradually decreasing the current from the maximum current (maximum light emission amount). Similar results can be obtained by another method, such as a method for detecting a linear area by starting from a minimum current (minimum light emission amount) and detecting the linear area just before the output level is saturated.

FIG. 8 is a flowchart illustrating the processing performed by the CPU 200 when a reference position is detected. The process will be described referring to the pan motor 215, but the similar process is executed for the tilt motor 255. It is assumed that the flag 530 is placed in the slit opening area of the photo interrupter 500 (in the state in FIG. 4C). In a case where the flag is not located in the opening area (in the state in FIG. 4A), step S100 is not required.

The CPU 200 gives a command to the pan motor driver 210 to drive the pan motor 215. As a result, the flag 530 is moved. In other words, by this process, in step S110, the photo interrupter 500 is set to be in the open state that the light from the LED 510 is not interrupted as illustrated in FIG. 4A.

As illustrated in FIG. 4A, when the photo interrupter 500 is in the open state, in step S110, the CPU 200 determines the light emission amount (IFln) described referring to FIG. 9 and detects the output level (LVLhigh) of the phototransistor 520.

A detailed processing of the operation is as described above. More specifically, the process in step S110 corresponds to those of steps S300 to S390 in FIG. 9. The description of the operation that is performed if the process proceeds to step S370 in FIG. 9 is not repeated in FIG. 8.

Then, the CPU 200 issues a command to the pan motor driver 210 to drive the pan motor 215. In other words, the photo interrupter 500 is in the light-blocked state as illustrated in FIG. 4C (S120).

When the photo interrupter is in the light-blocked state, the CPU 200 detects the output level of the phototransistor 520 when the light emission amount is at a value determined in step S110, and, in step S130, sets the detected output level as an output level in the light-blocked state (LVLlow).

In step 140, the CPU 200 determines a threshold value level (LVLth) based on the output level in the open state (LVLhigh) and the output level in the light-blocked state (LVLlow). Referring to this threshold level, for example, an intermediate value of the two levels (LVLth=(LVLhigh+LVLlow)/2) or a weighted average of those two levels as a threshold value level.

A threshold value level LVLth is calculated based on the LVLhigh and the LVLlow. However, a value of 50% or 55% of the LVLhigh, for example, may be determined as the threshold value level LVLth.

When the threshold value level for detecting a reference position has been determined, the CPU 200 performs a reference position detection operation by driving the pan motor 215 via the pan motor driver 210. In step S150, the CPU 200 moves the flag 530 to change the photo interrupter 500 from the light-blocked state to the open state by the operation in step S120.

Furthermore, in step S160, the CPU 200 detects the output level of the phototransistor 520, which changes with the above-described operation. In step S170, the CPU 200 determines whether the output level of the phototransistor 520 is larger than the threshold level determined in step S140.

If it is determined that the detected output level (LVL) is larger than the threshold value (LVLth) or equal to the threshold value (YES in step S170), the process advances to step S200. In step S200, the CPU 200 determines that the position of the flag 530 is the reference position. Then, in step S210, the CPU 200 stops the drive of the pan motor 215, and ends the process.

If the CPU 200 determines that the detected output level of the phototransistor 520 is not higher than the threshold value (NO in step S170), the process proceeds to step S180. In step S180, the CPU 200 determines whether the flag 530 has passed the slit area and entered the open state area driven the pan motor.

If, in step S180, the flag 530 has moved to the open state illustrated in FIG. 4A without the output level of the phototransistor 520 exceeding the threshold value (YES in step S180), the process advances to step 190 and the CPU 200 determines that an error has occurred.

FIGS. 10A and 10B are diagrams for schematically illustrating the reference position detection process. FIG. 10A illustrates the relationship between the position of the flag 530 and the output level of the phototransistor 520. FIG. 10B is illustrates a moving operation of the flag 530 and a process of detecting the output level of the phototransistor 520 at each position of the flag when the reference position is detected.

The "A" in FIG. 10B indicates an initial condition when a reference position is detected, which is an open state (the state in FIG. 4A) in which the photo interrupter 500 is in a state where the light from the LED 510 is not blocked. The black dot indicates the position of the flag 530 in the open state. The arrow indicates the moving direction of the flag 530.

The "B" indicates an initial condition when the reference position is detected, which is a light-blocked state (the state in FIG. 4B or 4C) in which the light from the LED 510 is blocked in the photo interrupter 500. The black dot indicates the position of the flag 530 in the light blocked state and the arrow indicates the moving direction of the flag 530.

In the initial condition indicated by "A" in FIG. 10B, (1) the output level (LVLhigh) of the phototransistor 520 in the open state (the state in FIG. 4A) is determined.

Then, (2) the flag 530 is moved in the arrow direction to detect the output level in the light blocked state, and the output level in the light blocked state (LVLlow) in FIG. 4C is determined.

Then, (3) while the flag 530 is moved in the arrow direction to detect the reference position, the output level of the phototransistor 520 is detected, and the position where the threshold value (LVLth) is exceeded is determined as the reference position.

On the other hand, at "B" in FIG. 10B, (1) the flag 530 is moved in the arrow direction (to the open side) to detect the output level (LVLhigh) of the phototransistor 520 in the open state (the state in FIG. 4A). This movement of the flag 530 is performed in step S100 in FIG. 8.

Then, (2) the flag 530 is moved in the arrow direction to detect the output level in the light blocked state, and the output level in the light blocked state (LVLlow) in FIG. 4C.

And, (3) while the flag 530 is moved in the arrow direction in order to detect the reference position, the output level of the phototransistor 520 is kept being detected, and when the output level exceeds the threshold value (LVLth), the position is determined as the reference position.

As described above, the light emission amount from the light emitting unit 520 is controlled so that the output level of the phototransistor 520 as the light receiving sensor changes linearly in the slit opening area. Therefore, it is possible to always detect a highly reproducible reference position with high accuracy without being affected by variations of the components, environmental changes such as temperature and voltage, and deterioration with time. Consequently, it is possible to control the shooting direction of the camera with high accuracy.

In a second exemplary embodiment, an exemplary embodiment configured to detect a reference position without moving the flag 530 in such a manner as illustrated in FIG. 4C. As described above, the output level in the light blocked state (LVLlow) is the output level of the phototransistor 520 in the light blocked state, that is, when the light passing through the slit opening of the photo interrupter 500 is blocked with the flag 530.

In the light blocked state, the light emission amount of the LED 510 is basically unrelated with the output level of the phototransistor 520 so long as there is no leaking light. As a result, the output level in the light blocked state (LVLlow) is determined by a dark current of the phototransistor 520.

In the second exemplary embodiment, after the output level (LVLhigh) of the phototransistor 520 in the open state is detected, the light blocked state is obtained by stopping the light emission of the LED 510. In this light blocked state, the light-blocked output level (LVLlow) of the phototransistor 520 is detected.

Since the subsequent operation is similar to the operation performed in the first exemplary embodiment, its description is not repeated. By the arrangement as described, the reference position can be detected at high speed.

In a third exemplary embodiment, an embodiment is described which uses the output level in the open state (LVLhigh) without using the output level in the light blocked state (LVLlow) for detecting a reference position.

The output level in the light blocked state (LVLlow) is determined by a dark current of the phototransistor 520. Since the light-blocked output level is affected by environmental condition, but in terms of absolute value, this output level is not large. Therefore, in this third exemplary embodiment, the output level in the light blocked state (LVLlow) is not detected.

More specifically, after the output level of the phototransistor 520 in the open state (LVLhigh) is detected, a threshold value is determined only based on the output level in the open state (LVLhigh). The threshold value (LVLth) is ½ of the output level in the open state, i.e., LVLth=LVLhigh/2, for example.

Thus, the reference position can be detected only by using the output level in the open state. In the third exemplary embodiment, because the output level in the light blocked state (LVLlow) is not detected, the reference position can be detected at higher speed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-226987 filed Sep. 4, 2008, which is hereby incorporated by reference herein in its entirety.

What is claimed is:

1. A detection apparatus comprising:
a control unit configured to control a light emission amount emitted from a light-emitting unit;
a light-receiving unit configured to receive light from the light-emitting unit; and
a determination unit configured to determine an operation emission amount of the light-emitting unit that makes the light-receiving unit output at a reference level, and to detect based on the output of the light-receiving unit that the light emitted from the light-emitting unit to the light-receiving unit is blocked, in a condition that the light-emitting unit is emitting light at the operation emission amount determined by the determination unit.

2. The detection apparatus according to claim 1, wherein the determination unit moves a position of a component and detects that the component is moved to a position where the component blocks the light emitted from the light-emitting unit to the light-receiving unit.

3. The detection apparatus according to claim 1, wherein the determination unit determines a second reference level for detecting whether the light emitted from the light-emitting unit to the light-receiving unit is blocked, according to the reference level which is outputted from the light-receiving unit when the determination unit determines the operation emission amount, and detects, based on the determined second reference level and the output of the light-receiving unit, that the light is blocked.

4. The detection apparatus according to claim 1, wherein the determination unit moves a position of a component, and determines the operation emission amount in a condition that the component is moved to a position at which the component does not block the light emitted from the light-emitting unit to the light-receiving unit.

5. The detection apparatus according to claim 1, wherein the determination unit determines the reference level in a condition that the output of the light-receiving unit is unsaturated.

6. The detection apparatus according to claim 1, wherein the determination unit determines an output level of the light-emitting unit which is different from a saturated level by a predetermined ratio or value as the reference level.

7. A camera including the detection apparatus in claim 1, wherein the detection apparatus detects a reference position for panning or tilting angle by detecting whether the light emitted from the light-emitting unit to the light-receiving unit is blocked.

8. The detection apparatus according to claim 1, wherein the determination unit determines the operation emission amount of the light-emitting unit, in a condition that the output of the light-receiving unit changes according to a change of the light emission amount of the light-emitting unit under the control by the control unit.

9. A detection method comprising:
detecting an output of a light-receiving unit which receives a light emitted from a light-emitting unit;
determining a drive level of a drive signal for driving the light-emitting unit that makes the light receiving unit output at a reference level; and
under a condition that the light-emitting unit is driven by the drive signal at the determined drive level, detecting that the light emitted from the light-emitting unit to the light-receiving unit is blocked based on the detected output of the light-receiving unit.

10. The method according to claim 9, further comprising:
moving a position of a component; and detecting that the component has moved to a position where a the component blocks the light emitted from the light-emitting unit to the light-receiving unit.

11. The method according to claim 9, further comprising:
determining a second reference level to detect that the light, which is emitted from the light-emitting unit to the light-receiving unit, is blocked according to the reference level which is outputted from the light-receiving unit when the drive level is determined; and
detecting, based on the determined second reference level and the output of the light-receiving unit, that the light is blocked.

12. The method according to claim 9, further comprising:
moving a position of a component,
wherein the drive level is determined in a condition that the component is moved to a position where the component does not block the light emitted from the light-emitting unit to the light-receiving unit.

13. The method according to claim 9, wherein the drive level is determined in a condition that the light-receiving unit is unsaturated.

14. The method according to claim 9, wherein the output of the light-emitting unit different from a saturated level by a predetermined ratio or value is determined as the reference level.

15. The method according to claim 9, wherein the drive level is determined, in a condition that the output of the light-receiving unit changes according to a change of the light emission amount of the light-emitting unit.

16. A non-transitory computer-readable storage medium storing a computer-executable program, the program comprising:
detecting an output of a light-receiving unit which receives a light emitted from a light-emitting unit;
determining a drive level of a drive signal for driving the light-emitting unit that makes the light-receiving unit output at a reference level; and
under a condition that the light-emitting unit is driven by the drive signal at the determined drive level, detecting that the light emitted from the light-emitting unit to the light-receiving unit is blocked based on the detected output of the light-receiving unit.

17. The non-transitory computer-readable storage medium according to claim 16, the program further comprising:
moving a position of a component; and
detecting that the component has moved to a position where the component blocks the light emitted from the light emitting unit to the light-receiving unit.

18. The non-transitory computer-readable storage medium according to claim 16, the program further comprising:
determining a second reference level that is used to detect that the light, which is emitted from the light-emitting unit to the light-receiving unit, is blocked, using the reference level which is outputted from the light receiving unit when the drive level is determined; and
detecting, based on the second determined reference level and the output of the light-receiving unit, that the light is blocked.

19. The non-transitory computer-readable storage medium according to claim 16, the program further comprising:
moving a position of a component;
wherein the drive level is determined in a condition that the component is move to a position where the component does not block the light emitted from the light-emitting unit to the light-receiving unit.

20. The non-transitory computer-readable storage medium according to claim 16, wherein the drive level is determined in a condition that the output of the light-receiving unit is unsaturated.

21. The non-transitory computer-readable storage medium according to claim 16, wherein the output of the light-emitting unit different from a saturated level by a predetermined ratio or value is determined at the reference level.

* * * * *